United States Patent
Wiberg et al.

(10) Patent No.: US 10,516,463 B2
(45) Date of Patent: Dec. 24, 2019

(54) METHOD FOR INDICATING A TRANSMISSION TIME OFFSET OF A FEEDBACK MESSAGE

(71) Applicant: Telefonaktiebolaget LM Ericsson (publ), Stockholm (SE)

(72) Inventors: Niclas Wiberg, Linköping (SE); Andreas Bergström, Vikingstad (SE); Martin Hessler, Linköping (SE); Qiang Zhang, Täby (SE); Mattias Frenne, Uppsala (SE); Johan Furuskog, Stockholm (SE); Håkan Andersson, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 81 days.

(21) Appl. No.: 15/503,679

(22) PCT Filed: Nov. 1, 2016

(86) PCT No.: PCT/SE2016/051067
§ 371 (c)(1),
(2) Date: Feb. 13, 2017

(87) PCT Pub. No.: WO2017/176182
PCT Pub. Date: Oct. 12, 2017

(65) Prior Publication Data
US 2018/0167126 A1 Jun. 14, 2018

Related U.S. Application Data

(60) Provisional application No. 62/319,306, filed on Apr. 7, 2016.

(51) Int. Cl.
*H04B 7/06* (2006.01)
*H04L 1/18* (2006.01)
(Continued)

(52) U.S. Cl.
CPC ......... *H04B 7/0628* (2013.01); *H04L 1/1812* (2013.01); *H04W 72/0446* (2013.01); *H04W 56/004* (2013.01)

(58) Field of Classification Search
CPC ....... H04L 1/18; H04L 1/1812; H04B 7/0628; H04B 7/06; H04W 72/0446; H04W 56/004; H04W 72/04
(Continued)

(56) References Cited

U.S. PATENT DOCUMENTS 8,205,128 B2 * 6/2012 Yoo ........................ H04L 1/1845
714/748
8,316,269 B2 * 11/2012 Zhang ................... H04L 1/1835
714/748
(Continued)

FOREIGN PATENT DOCUMENTS

EP 2955870 A1 12/2015
WO 2014071304 A1 5/2014

OTHER PUBLICATIONS

Nokia Siemens Networks et al., "R1-122428: HARQ-ACK resource allocation for data scheduled via ePDCCH," Third Generation Partnership Project (3GPP), TSG-RAN WG1 Meeting #69, May 21-25, 2012, 2 pages, Prague, Czech Republic.
(Continued)

Primary Examiner — Man U Phan
(74) Attorney, Agent, or Firm — Withrow & Terranova, PLLC

(57) ABSTRACT

A method performed by a radio-network node for handling a data transmission in a number of subframes from the radio-network node to a wireless device in a wireless communication network. The radio-network node transmits data over the number of subframes to the wireless device. Each subframe comprises a control part associated with the data of the subframe. Each respective control part comprises
(Continued)

a feedback index indicating a transmission time offset of a feedback message. The feedback message is to comprise a respective feedback indication of the number of subframes to be transmitted simultaneously from the wireless device to the radio-network node in the feedback message.

20 Claims, 10 Drawing Sheets

(51) Int. Cl.
*H04W 72/04* (2009.01)
*H04W 56/00* (2009.01)

(58) Field of Classification Search
USPC .................................................. 370/310, 329
See application file for complete search history.

(56) References Cited

U.S. PATENT DOCUMENTS

| | | | | |
|---|---|---|---|---|
| 8,498,228 | B2* | 7/2013 | Lee | H04L 1/1854 |
| | | | | 370/310 |
| 9,167,575 | B2* | 10/2015 | Park | H04W 72/042 |
| 9,271,302 | B2* | 2/2016 | Novak | H04W 72/04 |
| 9,295,044 | B2* | 3/2016 | Novak | H04W 72/042 |
| 9,380,568 | B2* | 6/2016 | Harrison | H04W 72/042 |
| 9,635,657 | B2* | 4/2017 | Novak | H04W 72/042 |
| 9,655,087 | B2* | 5/2017 | Park | H04W 72/0413 |
| 9,699,589 | B2* | 7/2017 | Novak | H04W 4/70 |
| 9,807,740 | B2* | 10/2017 | Oizumi | H04L 1/1861 |
| 9,872,282 | B2* | 1/2018 | Han | H04W 52/243 |
| 9,930,645 | B2* | 3/2018 | Novak | H04W 72/042 |
| 9,955,461 | B2* | 4/2018 | Song | H04L 1/1607 |
| 2012/0320837 | A1* | 12/2012 | Kim | H04W 72/042 |
| | | | | 370/329 |
| 2013/0230017 | A1* | 9/2013 | Papasakellariou | |
| | | | | H04W 72/0406 |
| | | | | 370/330 |
| 2013/0322352 | A1* | 12/2013 | Han | H04W 72/0413 |
| | | | | 370/329 |
| 2018/0098223 | A1* | 4/2018 | Hugl | H04W 72/1268 |
| 2018/0160425 | A1* | 6/2018 | Wiberg | H04L 1/1614 |

OTHER PUBLICATIONS

Samsung, "R1-122259: HARQ-ACK PUCCH Resources in Response to ePDCCH Detections," Third Generation Partnership Project (3GPP), TSG RAN WG1 #69, May 21-25, 2012, 2 pages, Prague, Czech Republic.

International Search Report and Written Opinion for International Patent Application No. PCT/SE2016/051067, dated Jan. 26, 2017, 10 pages.

Extended European Search Report for European Patent Application No. 16898077.9, dated Feb. 28, 2019, 7 pages.

* cited by examiner

METHOD FOR INDICATING A TRANSMISSION TIME OFFSET OF A FEEDBACK MESSAGE

This application is a 35 U.S.C. § 371 national phase filing of International Application No. PCT/SE2016/051067, filed Nov. 1, 2016, which claims the benefit of U.S. Provisional Application No. 62/319,306, filed Apr. 7, 2016, the disclosures of which are incorporated herein by reference in their entireties.

TECHNICAL FIELD

Embodiments herein relate to a radio-network node, a wireless device and methods performed therein. In particular, embodiments herein relate to handling a data transmission in a number of subframes from a radio-network node to the wireless device in a wireless communication network.

BACKGROUND

In a typical wireless communication network, wireless devices, also known as wireless communication devices, mobile stations, stations (STA) and/or user equipments (UE), communicate via a Radio-Access Network (RAN) to one or more core networks (CN). The RAN covers a geographical area which is divided into service areas or cell areas, which may also be referred to by a beam or a beam group which covers the area, with each service area or cell area being served by a radio-network node such as a radio-access node e.g., a Wi-Fi access point or a radio base station (RBS), which in some networks may also be denoted, for example, a "NodeB" or "eNodeB". A service area or cell area is a geographical area where radio coverage is provided by the radio-network node. The radio-network node communicates over an air interface operating on radio frequencies with the wireless device within range of the radio-network node.

A Universal Mobile Telecommunications System (UMTS) is a third generation (3G) telecommunication network, which evolved from the second generation (2G) Global System for Mobile Communications (GSM). The UMTS terrestrial radio-access network (UTRAN) is essentially a RAN using Wideband Code-Division Multiple Access (WCDMA) and/or High-Speed Packet Access (HSPA) for user equipments. In a forum known as the Third Generation Partnership Project (3GPP), telecommunications suppliers propose and agree upon standards for third generation networks, and investigate enhanced data rate and radio capacity. In some RANs, e.g. as in UMTS, several radio-network nodes may be connected, e.g., by landlines or microwave, to a controller node, such as a Radio Network Controller (RNC) or a Base Station Controller (BSC), which supervises and coordinates various activities of the plural radio-network nodes connected thereto. This type of connection is sometimes referred to as a backhaul connection. The RNCs and BSCs are typically connected to one or more core networks.

Specifications for the Evolved Packet System (EPS), also called a Fourth Generation (4G) network, have been completed within the $3^{rd}$ Generation Partnership Project (3GPP) and this work continues in the coming 3GPP releases, for example to specify a Fifth Generation (5G) network. The EPS comprises the Evolved Universal Terrestrial Radio-Access Network (E-UTRAN), also known as the Long-Term Evolution (LTE) radio-access network, and the Evolved Packet Core (EPC), also known as System Architecture Evolution (SAE) core network. E-UTRAN/LTE is a variant of a 3GPP radio-access network wherein the radio-network nodes are directly connected to the EPC core network rather than to RNCs. In general, in E-UTRAN/LTE the functions of an RNC are distributed between the radio-network nodes, e.g. eNodeBs in LTE, and the core network. As such, the RAN of an EPS has an essentially "flat" architecture comprising radio-network nodes connected directly to one or more core networks, i.e. they are not connected to RNCs. To compensate for that, the E-UTRAN specification defines a direct interface between the radio-network nodes, this interface being denoted the X2 interface. EPS is the Evolved 3GPP Packet Switched Domain.

Advanced Antenna Systems (AASs) is an area where technology has advanced significantly in recent years and where we also foresee a rapid technology development in the years to come. Hence it is natural to assume that AASs in general and massive Multiple Input Multiple Output (MIMO) transmission and reception in particular will be a cornerstone in a future Fifth Generation (5G) system.

In relation to the Advanced Antenna Systems (AAS), beam-forming is becoming increasingly popular and capable and it is not only for transmission of data but also for transmission of control information. This is one motivation behind the (relatively) new control channel in Long-Term Evolution (LTE) known as Enhanced Physical Downlink Control Channel (ePDCCH). When the control channel is beam-formed, the cost of transmitting the overhead control information can be reduced due to the increased link budget provided by the additional antenna gain.

Automatic repeat-request (ARQ) is an error-control technique used in many wireless networks. With ARQ, a receiver of data transmissions sends acknowledgements (ACKs) or negative acknowledgments (NACKs) to inform the transmitter of whether each message has been correctly received. Incorrectly received messages, as well as messages that aren't acknowledged at all, can then be re-transmitted.

Hybrid ARQ (HARQ) combines ARQ with forward error-correction (FEC) coding of the data messages, to improve the ability of the receiver to receive and correctly decode the transmitted messages. As with conventional ARQ, receivers employing HARQ send ACKs and NACKs, as appropriate, after each attempt to decode a message. These ACKs and NACKs are referred to as "HARQ feedback."

For downlink HARQ transmissions in LTE today, HARQ feedback is sent from the wireless device, e.g. a User Equipment (UE) to the Network (NW) on e.g. via either Physical Uplink Control Channel (PUCCH) or Physical Uplink Shared Channel (PUSCH), depending on whether the wireless device has been scheduled for uplink PUSCH transmission or not. The NW such as the radio-network node may thereafter, on an individual HARQ process basis, draw conclusions on whether the last HARQ reception for that process was successful or not (ACK/NACK) or even if the Downlink (DL) Assignment reception failed, i.e. the wireless device does not send any feedback also called Discontinuous Transmission (DTX).

The timing of the transmitted HARQ feedback in LTE is such that, for Frequency-Division Duplexing (FDD), the feedback from one HARQ Receive (RX) process is received in the Uplink (UL) in subframe n+4 if the corresponding DL transmission for that process was in subframe n, corresponding to 4 milliseconds (ms) in total. For Time Division Duplexing (TDD), the delay from DL data transmission to UL feedback reception may be larger than four to cater for the half-duplex DL-UL split.

Providing feedback as in prior art may limit the performance of the wireless communication network.

SUMMARY

An object herein is to provide a mechanism that enhances performance of the wireless communication network.

According to a first aspect, the object is achieved by a method performed by a radio-network node for handling a data transmission in a number of subframes from the radio-network node to a wireless device in a wireless communication network.

The radio-network node transmits data over the number of subframes to the wireless device. Each subframe comprises a control part associated with the data of the subframe. Each respective control part comprises a feedback index indicating a transmission time offset of a feedback message. The feedback message is to comprise a respective feedback indication of the number of subframes to be transmitted simultaneously from the wireless device to the radio-network node in the feedback message.

According to a second aspect, the object is achieved by a method performed by a wireless device for handling a data transmission in a number of subframes from a radio-network node to the wireless device in a wireless communication network.

The wireless device receives data over the number of subframes from a radio-network node. Each subframe comprises a control part associated with the data of the subframe. Each respective control part comprises a feedback index indicating a transmission time offset of a feedback message. The feedback message is to comprise a respective feedback indication of the number of subframes to be transmitted simultaneously from the wireless device to the radio-network node in the feedback message.

The wireless device transmits the respective feedback indication of the number of subframes simultaneously in the feedback message as indicated in the received control parts of the transmission, to the radio-network node.

According to a third aspect, the object is achieved by a radio-network node for handling a data transmission in a number of subframes, from the radio-network node to a wireless device in a wireless communication network. The radio-network node is configured to transmit data over the number of subframes to the wireless device 10, each subframe comprising a control part associated with the data of the subframe, each respective control part comprising a feedback index indicating a transmission time offset of a feedback message, which feedback message is to comprise a respective feedback indication of the number of subframes, to be transmitted simultaneously from the wireless device to the radio-network node in the feedback message.

According to a fourth aspect, the object is achieved by a wireless device for handling a data transmission in a number of subframes, from a radio-network node to the wireless device in a wireless communication network. The wireless device is configured to receive data over the number of subframes from a radio-network node. Each subframe comprises a control part associated with the data of the subframe. Each respective control part comprises a feedback index indicating a transmission time offset of a feedback message. The feedback message is to comprise a respective feedback indication of the number of subframes to be transmitted simultaneously from the wireless device to the radio-network node in the feedback message. The wireless device is further configured to transmit the respective feedback indication of the number of subframes simultaneously in the feedback message as indicated in the received control parts of the transmission to the radio-network node.

Thus, embodiments herein provide a mechanism that efficiently sets up the configuration of the feedback i.e. providing information when and where, in the message, the feedback is provided in a compact feedback structure. Compact feedback structure herein meaning that feedback for a number of subframes carrying data of a data transmission are provided simultaneously back to the radio-network node.

BRIEF DESCRIPTION OF THE DRAWINGS

Embodiments will now be described in more detail in relation to the enclosed drawings, in which.

DETAILED DESCRIPTION

Figure 1:
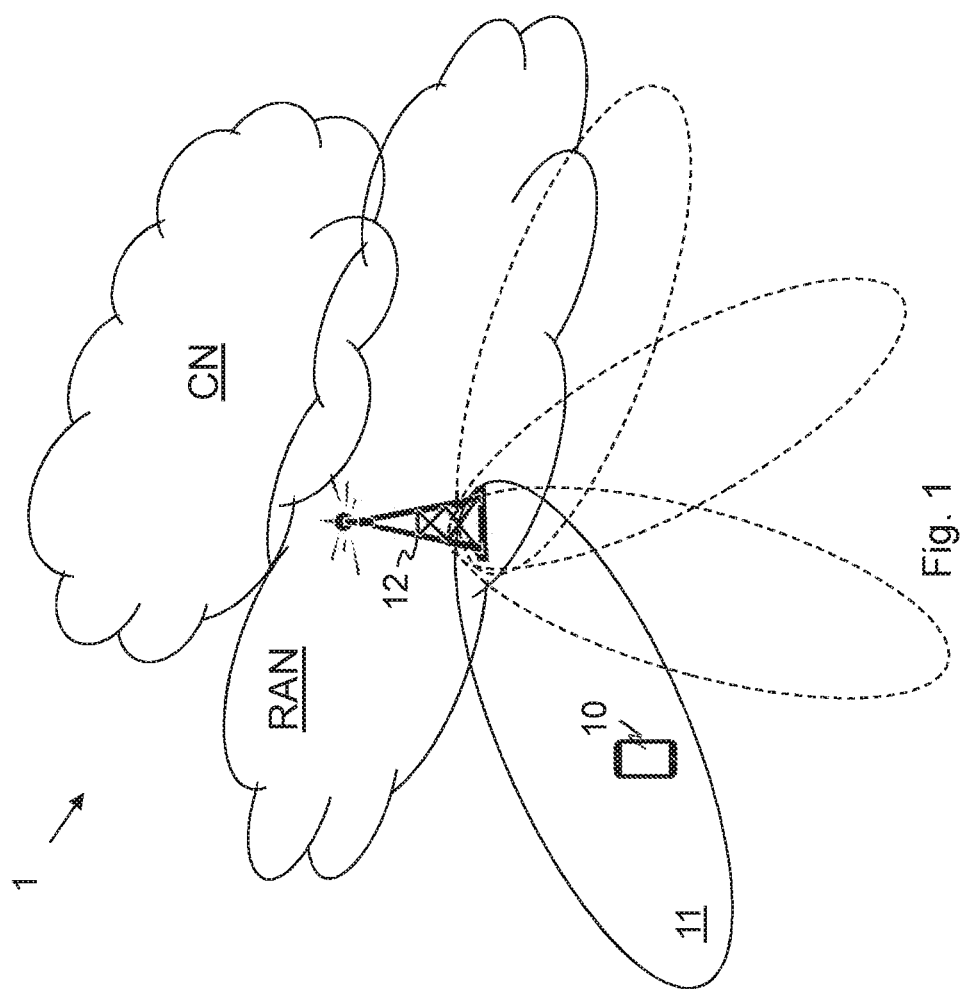
FIG. 1 is an overview depicting a wireless communication network according to embodiments herein.

Embodiments herein relate to wireless communication networks in general. FIG. 1 is a schematic overview depicting a wireless communication network 1. The wireless communication network 1 comprises one or more RANs and one or more CNs. The wireless communication network 1 may use a number of different technologies, such as Wi-Fi, Long-Term Evolution (LTE), LTE-Advanced, 5G, Wideband Code-Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are also applicable in further development of the existing wireless communication systems such as e.g. WCDMA and LTE.

In the wireless communication network 1, wireless devices e.g. a wireless device 10 such as a mobile station, a non-access point (non-AP) STA, a STA, a user equipment and/or a wireless terminal, communicate via one or more Access Networks (AN), e.g. RAN, to one or more Core Networks (CN). It should be understood by the skilled in the art that "wireless device" is a non-limiting term which means any terminal, wireless communication terminal, user equipment, Machine-Type Communication (MTC) device, Device-to-Device (D2D) terminal, or node e.g. smart phone, laptop, mobile phone, sensor, relay, mobile tablets or even a small base station communicating within a cell.

The wireless communication network 1 comprises a radio-network node 12 providing radio coverage over a geographical area, a service area 11, which may also be referred to as a beam or a beam group, of a first Radio-Access Technology (RAT), such as 5G, LTE, Wi-Fi or similar. The radio-network node 12 may be a transmission and reception point e.g. a radio-access network node such as a Wireless Local-Area Network (WLAN) access point or an Access-Point Station (AP STA), an access controller, a base station, e.g. a radio base station such as a NodeB, an evolved Node B (eNB, eNode B), a base transceiver station, a radio remote unit, an Access Point Base Station, a base station router, a transmission arrangement of a radio base station, a stand-alone access point or any other network unit capable of communicating with a wireless device within the service area served by the first access point 12 depending e.g. on the first radio-access technology and terminology used. The radio-network node 12 may be referred to as a serving radio-network node and communicates with the wireless device 10 with Downlink (DL) transmissions to the wireless device 10 and Uplink (UL) transmissions from the wireless device 10.

The wireless device 10 provides feedback, e.g. HARQ feedback, relating to a data transmission, the data being transmitted over a shared channel such as e.g. a Physical Downlink Shared Channel (PDSCH), from the radio-network node 12. The data transmission comprising a number of subframes, each with an associated control part, e.g. a DL grant, and a data part. The data transmission generates or triggers a corresponding HARQ feedback indication or feedback indicator, e.g. ACK/NACK, for each data part. The control parts are transmitted on a control channel, e.g. a Physical Downlink Control Channel PDCCH or ePDCCH, while the data are sent over a data channel e.g. the PDSCH. The HARQ feedback may be transmitted as part of the Uplink Control Information (UCI) on a specific Physical Uplink Control Channel (PUCCH) or multiplexed onto the Physical Uplink Data Channel (PUSCH). The specific physical uplink control channel may be referred to as xPUCCH.

In, e.g. a 5G system, the specific UL control channel—e.g. xPUCCH—may be transmitted on one Orthogonal Frequency-Division Multiplexing (OFDM) symbol. This channel will provide a limited number of bits, say e.g. 1 to 4 information bits or more bits, by either having a number of fixed formats, similar to LTE PUCCH format 1/1a/1b, or having one single format, still allowing for a flexible number of information bits.

Embodiments herein relate to a compact HARQ feedback on a UL control channel such as the xPUCCH, e.g. each control part, e.g. DL grant, reserves a resource in the UL control channel for the feedback e.g. one bit for indicating ACK or NACK. According to embodiments herein the DL grant, also called PDSCH grant, may comprise a feedback index or feedback index value. E.g. the DL grant may comprise Downlink Control Information (DCI) fields that comprise the feedback Index of two bits, 0 . . . 3. A feedback index of two bits, 0 . . . 3, means that they indicate which of four possible HARQ resources, with corresponding delays, to use for feedback of this transmission. When using the term "feedback index" the different HARQ resources are being pointed out (indexed) and when using the terminology "feedback index value" the two bits are interpreted as numerical values, typically 0, 1, 2, and 3. The feedback index value is indicating a time offset, or delay, when to transmit the reserved feedback part and the feedback index may be associated with a position in the reserved feedback part. Hence, the feedback index may determine a position of ACK/NACK of a feedback message. The feedback index value also determines a feedback delay, also called offset value. E.g. the feedback index value is added to a semi-statically configured minimum feedback delay value. This minimum feedback delay value may be related to capability of the wireless device 10 to process received data. The term feedback Index thus relates to a position in the feedback message while a feedback index value relates to the numerical value obtained when interpreting the feedback index as a number, e.g. in the range 0 . . . 3. In the following the terms may be used interchangeably when it is clear from the context which interpretation that is applicable.

Thus, embodiments herein provide a mechanism that efficiently sets up the configuration of the feedback providing information when and where in the feedback message the feedback is provided in a compact feedback structure. Compact feedback structure herein meaning that feedback for a number of subframes carrying data of a data transmission are provided simultaneously back to the radio-network node 12 in the same feedback message.

Furthermore, two or more DL data transmissions, e.g. xPDSCH transmissions, may occur simultaneously, each DL transmission transmitting its own data over subframes. Feedback is needed for both data transmissions such as xPDSCH transmissions and embodiments herein also relate to one feedback message such as HARQ feedback message containing feedback for simultaneous data transmissions such as xPDSCH transmissions.

Thus, embodiments herein provide a mechanism that efficiently sets up the configuration of the feedback i.e. provide information when and where, in the feedback message, the feedback is provided in a compact feedback structure in the feedback message. Compact feedback structure herein meaning that feedback for a number of subframes carrying data of a data transmission are provided simultaneously back to the radio-network node 12.

Figure 2:
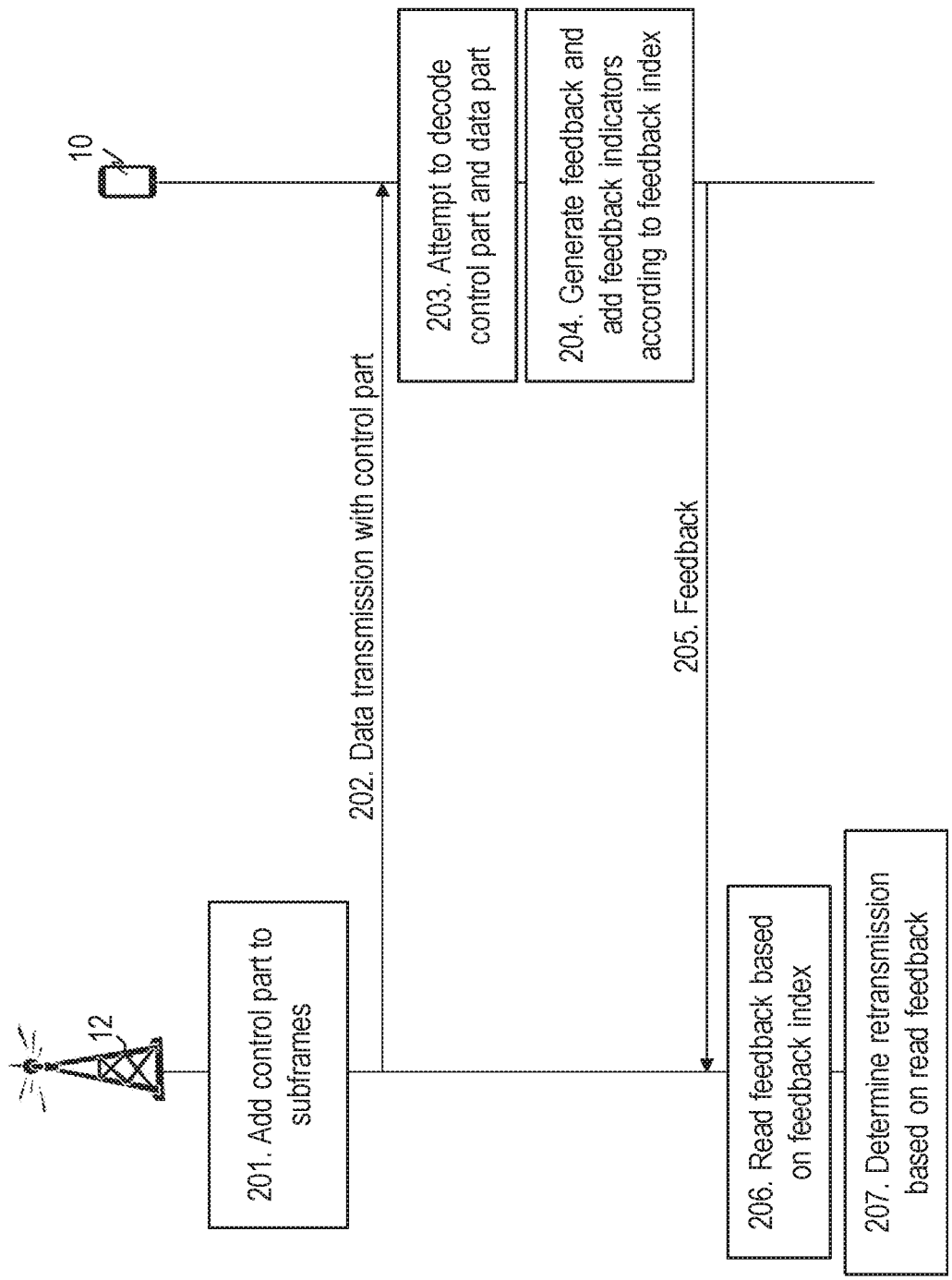
FIG. 2 is a combined flowchart and signalling scheme according to embodiments herein.

FIG. 2 is a combined flowchart and signaling scheme according to embodiments herein.

Action 201. According to some embodiments, the radio-network node 12 is configured to indicate in a data transmission such as a DL transmission e.g. in a control part associated with data in a subframe of the data transmission over a PDSCH for the wireless device 10 when and where to transmit feedback of the data transmission. Thus, according to an example scenario, the radio-network node 12 is to transmit data to the wireless device 10 and may add the control part, also referred to as control information, to the DL transmission. The control part, e.g. DCI, comprises an index value also referred to as feedback index value. Note that the terms feedback index and feedback index value may be used interchangeably herein. The feedback index value indicates a transmission time offset such as a delay defining when in time to send a response message such as a feedback message comprising added feedback of a subframe in the data transmission. This means that upon receiving a particular subframe the wireless device 10 shall wait for a given time, which is the transmission time such as the delay or the time offset, before sending the feedback regarding the particular subframe in a response message. To be able to send the feedback of several subframes of the data transmission simultaneously in a feedback message, which subframes are received by the wireless device 10 at different points in time, said transmission time offsets such as the delay or the time offset for the different subframes need to be different. The feedback index value further indicates where in the message the feedback is placed, e.g. a position number. A first delay may be defined to a zero value, wherein the zero value is associated with a preconfigured and/or a default value at the wireless device 10, such as e.g. 4 ms. As the transmission time such as the delay or the time offset may be defined in subframes, a subframe with data previously received may have a feedback index value set to '1' indicating a delay of default and/or a preconfigured value plus one subframe. Simultaneously, the feedback index value according to embodiments herein indicate a position in the feedback message such as the UL control message, hence, value zero indicates position zero, value one indicates position one, etc., where position zero is a first value read in the feedback message such as the UL control message. Thus, value zero of the feedback index value e.g. in the DCI, indicates the feedback of the subframe to be transmitted at a default offset time, and in position zero in the UL control message. A position means an index or location in the feedback message, which may be seen as a sequence of one or several feedback indications. For instance, each feedback indication may be a single binary bit, so that feedback message is a sequence of bits. Before transmission, the feedback message may be processed using traditional transmission techniques such as encoding, modulation, layer mapping, precoding, and transformation. Depending on the usage of such technologies, a feedback position may or may not relate to a time or frequency within a feedback message.

This will be described more in detail and exemplified below.

Action 202. The radio-network node 12 transmits the data transmission, data mapped to subframes, with associated control part e.g. the DL grant. This means that the radio-network node 12 transmits the data over the number of subframes to the wireless device 10. Each subframe comprises a control part associated with the data of the subframe. Each respective control part comprises a feedback index indicating a transmission time offset of a feedback message and a position in the feedback message. Accordingly, the feedback message is to comprise a respective feedback indication of the number of subframes, to be transmitted simultaneously from the wireless device 10 to the radio-network node 12 in the feedback message.

Action 203. The wireless device 10 attempts to decode the control part such as the DL control parts and the data parts of the data transmission such as the DL data transmissions. E.g. a number of consecutive subframes each comprising a control part with a respective feedback index such as the feedback index value, and a data part. In case the wireless device 10 succeeds in decoding one DL control part the wireless device 10 further attempts to decode the DL data in the data part.

Action 204. The wireless device 10 generates feedback in accordance with the decoding attempt and in a compact manner. In case the wireless device 10 succeeds in decoding one DL control part and successfully decodes the data part in the subframe an ACK is generated and in case the data part is not successfully decoded an NACK is generated. If the control part is not decoded the wireless device 10 will as default transmit NACK as feedback for that subframe.

In an example scenario, the wireless device 10 may be configured and/or requested to aggregate feedback of e.g. four subframes. However, in some embodiments the wireless device 10 may be configured and/or requested to aggregate feedback of more or less than four subframes. In the example scenario, the wireless device 10 decodes the data parts of the first and fourth subframes successfully but fails decoding the data part of the second subframe and does not detect the control part of the third subframe.

A positive feedback, ACK, is generated for the fourth subframe since it was successfully decoded. The feedback index value is zero for the fourth subframe indicating a default offset in time of the feedback information, ACK, at position zero of the feedback message, e.g. an UL control message.

No feedback is generated for the third subframe but a negative feedback, NACK, is generated for the third subframe. A negative feedback, NACK, may be transmitted by default when no decoding has been attempted for a subframe. To transmit NACK by default is one embodiment. Another embodiment is to transmit a special value such as DTX.

A negative feedback, NACK, is generated for the second subframe since the wireless device 10 failed to decode the data part of the second subframe. As the feedback index value is two for the second subframe this NACK is added at an offset of 2 subframes+the default offset value and at position two in the aggregated feedback message.

Similarly, a positive feedback, ACK, is generated for the first subframe. As the feedback index value is three for the first subframe this ACK is added at an offset of three subframes+the default offset value and at position three in the aggregated feedback message. If the feedback is one bit long a value of one may indicate ACK and a value of zero may indicate NACK or DTX.

Action 205. The generated feedback is transmitted from the wireless device 10 back to the radio-network node 12 as indicated in the control part of the subframes. This means that the feedback message comprises the respective feedback indication of the number of subframes and is transmitted simultaneously from the wireless device 10 to the radio-network node 12 in the feedback message.

Action 206. The radio-network node 12 receives the feedback message and reads the feedback, e.g. ACK at positions zero and three for the data transmission, based on the knowledge of the feedback index value previously sent. Thus, the radio-network node 12 knows which value in the UL control message relates to which data of the subframes.

In the example scenario, the radio-network node 12 may read in the feedback message:
- at position zero in the feedback message a value of one (1), is reported for the fourth subframe, a value of one indicates ACK,
- at position one in the feedback message a value of zero (0), is reported for the third subframe, a value of zero indicates NACK,
- at position two in the feedback message a value of zero (0), is reported for the second subframe, a value of zero indicates NACK,
- at position three in the feedback message a value of one (1), is reported for the first subframe, a value of one indicates ACK.

Action 207. The radio-network node 12 then determines whether to retransmit data of the different subframes based on the read feedback.

Figure 3:
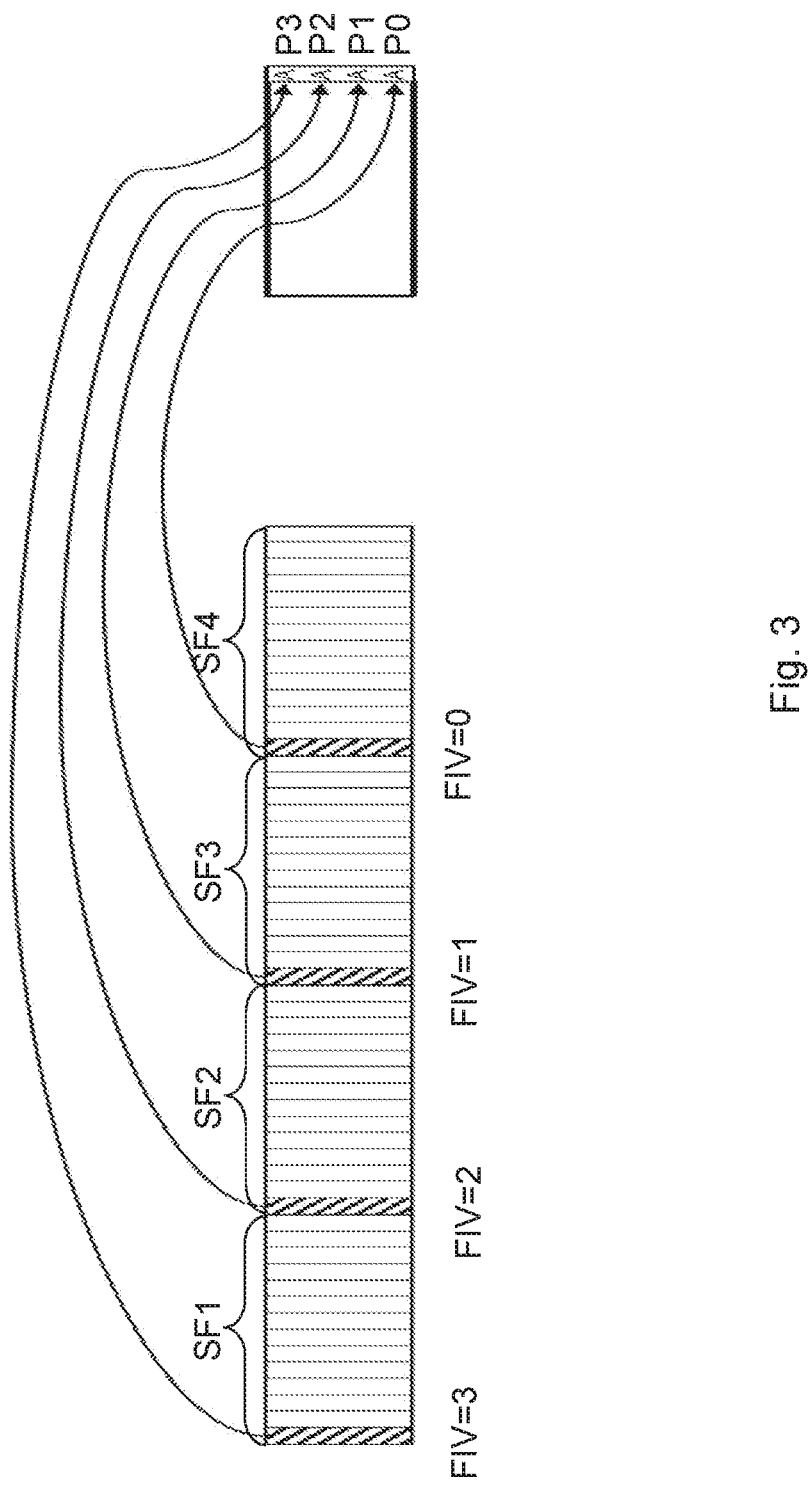
FIG. 3 is a block diagram depicting positioning of feedback indication in a feedback message according to embodiments herein.

FIG. 3 is a block diagram depicting an efficient manner of mapping feedback indications to a feedback message such as an UL control message, e.g. a (x)PUCCH, based on the feedback index or feedback index value (FIV) in an example according to embodiments herein. Feedback for a number of transmission blocks or subframes carrying data are aggregated into one feedback occasion.

A fourth subframe (SF), SF4, out of the number of SFs for which feedback is aggregated into one feedback occasion comprises a FIV of zero indicating a time offset or delay of a default/configured value and also indicating at a first position also called position zero, P0.

A third SF, SF3, out of the number of SFs comprises a FIV of one indicating a time offset or a delay of one subframe plus the offset of the default/configured value for the feedback indication to be transmitted. The feedback indication is to be indicated at a second position also called position one, P1.

A second SF, SF2, out of the number of SFs comprises a FIV of two indicating a time offset or delay of two subframes plus the offset of the default/configured value for the feedback indication of this subframe to be transmitted. The feedback indication is to be indicated at a third position also called position two, P2.

A first SF, SF1, out of the number of SFs comprises a FIV of three indicating a time offset or delay of three subframes plus the offset of the default/configured value for the feedback indication of this SF to be transmitted. The feedback indication is to be indicated at a fourth position also called position three, P3.

In the control part associated with respective subframe carrying data, Downlink grant DCI fields may comprise the FIV of 2 bits.

HARQ feedback encoding may be according to LTE PUCCH format 3, which supports up to 22 bits. Six bits or more may be used for HARQ feedback, e.g. $a_0, a_1, a_2, a_3, a_4, a_5$, where bits $a_0, a_1, a_2, a_3$: are ACK bits for up to four transmissions blocks or SFs. For example, ACK at feedback index $i \Rightarrow a_i=1$ and NACK or no transmission at feedback index $i \Rightarrow a_i=0$.

Figure 4:
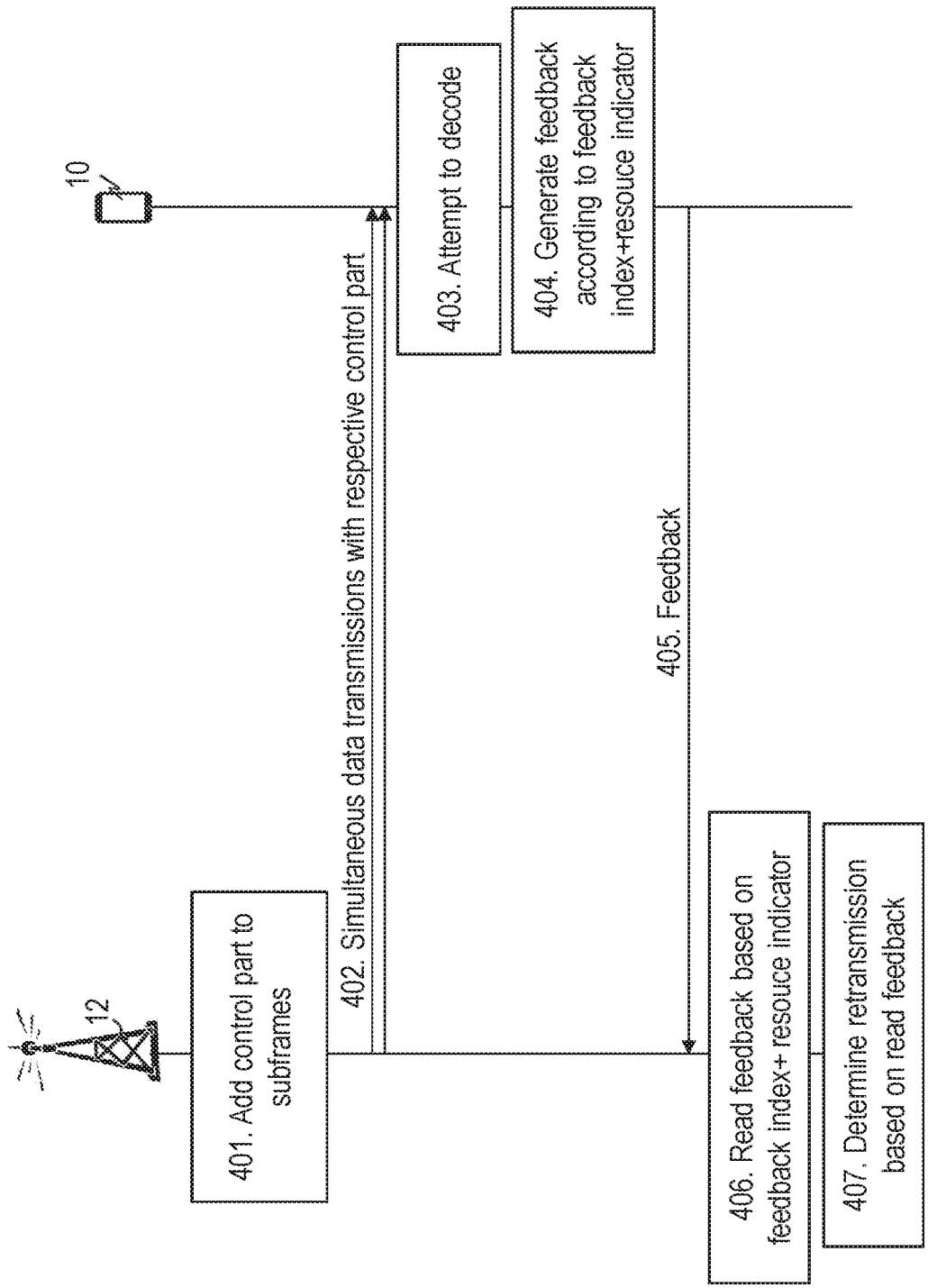
FIG. 4 is a combined flowchart and signalling scheme according to embodiments herein.

FIG. 4 is a combined flowchart and signaling scheme according to embodiments herein when two data transmission or transmission streams are sent to the wireless device 10 simultaneously. There may be two transport blocks per subframe in the case of multi-layer transmissions.

Action 401. The radio-network node 12 is configured to indicate in a DL grant transmission e.g. in a control part associated to data transmission over the PDSCH, for the wireless device when and where to transmit feedback of the transmission. Thus, the radio-network node 12 is to transmit data to the wireless device 10 and may add control part to the DL transmission. The control part, e.g. DCI, comprises an index value also referred to as feedback index value. The feedback index value indicates a delay defining when in time to add feedback to a response message also called feedback message. The feedback index value further indicates where in the feedback message a feedback indicator is placed, e.g. indicates a position number. A first delay may be defined to a zero value, wherein the zero value is associated with a preconfigured/default value at the wireless device 10 e.g. 4 ms. As the delay or offset may be defined in subframes, a SF previously received may have a feedback index value set to '1' indicating a delay of default/preconfigured value plus time of one subframe. Simultaneously, the feedback index value according to embodiments herein indicate position in the UL control message, e.g. value zero indicates position zero, value one indicates position one, etc. Thus, value zero of the feedback index value e.g. in the DCI, indicates the feedback indicator of that SF to be transmitted at a default offset time, and in position zero in the UL control message. So far this is performed in the same way as described under action 201.

Furthermore, as two data transmissions are performed towards the wireless device simultaneously, from the same or different radio-network nodes, the radio-network node 12 further adds a resource indicator, also called PUCCH resource indicator (PRI), to the control information and/or part indicating the UL resource, e.g. PUCCH, frequency, time, and/or symbol, to use for the feedback message.

Action 402. The radio-network node 12 transmits the both, or one of the, data transmissions comprising data over subframes, with the control part e.g. the DL grant, associated with the data. It should here be noted that in e.g. a beam-based system like 5G, the wireless device 10 may receive one beam from one radio-network node and another beam, with different data, from another radio-network node. However, there may also be two beams from the same radio-network node 12, in which case the wireless device 10 also receives two transport blocks in the same subframe.

Action 403. The wireless device 10 attempts to decode the DL control part and the data part of each data transmission, e.g. a number of consecutive subframes each with a control part with a respective feedback index value and resource indicator.

Action 404. The wireless device 10 generates feedback in accordance with the decoding attempt and in a compact manner. In case the wireless device 10 succeeds in decoding one DL control part and successfully decodes the data part in the subframe an ACK is generated and in case the data part is not successfully decoded an NACK is generated. If the control part is not decoded the wireless device 10 will not generate any feedback for that SF. In an example scenario, the wireless device 10 may be configured to aggregate feedback of e.g. four SFs. However, it may also be configured to aggregate feedback of more or less than four SFs. According to the example scenario, the wireless device 10 decodes the first and fourth DL SFs successfully but fails decoding the data part of the second SF and does not detect the control part of the third SF.

In the fourth SF the feedback index value is zero indicating a default offset in time of the feedback information, ACK, at position zero of the feedback message, UL control message.

No feedback is generated for the third SF but a negative feedback, NACK, is generated for the second SF. However, a negative feedback, NACK, is transmitted by default when no decoding has been attempted, i.e., no feedback has been generated, for this third subframe.

As the feedback index value is two for the second SF this NACK is added at an offset of 2 subframes+the default offset value and at position two in the aggregated feedback message.

Similarly, a positive feedback, ACK, is generated for the first data in the first SF.

As the feedback index value is three for the subframe this ACK is added at an offset of three subframes+the default offset value and at position three in the aggregated feedback message.

If the feedback is one bit long a value of one may indicate ACK and a value of 'O' may indicate NACK or DTX.

Furthermore, each control part and/or information of the subframe may indicate, e.g. with an (x)PUCCH Resource Indicator (PRI), in which UL resource the feedback indicators should be added when two data transmissions are received simultaneously. Thus, the feedback message of each data transmission out of the two or more data transmissions, is added into the UL resource as indicated by the resource indicator of the control part. The resource indicator may be an index value known for e.g. a PUCCH, a frequency, a time, and/or a symbol, at the wireless device 10.

Action 405. The generated feedback is transmitted from the wireless device 10 back to the radio-network node 12 according to the control part in the transmissions in a similar way as described in action 205.

Action 406. The radio-network node 12 receives and reads the received feedback in the feedback message e.g. ACK at positions zero and three for the first data transmission and all ACKs for the second data transmission, based on the knowledge of the feedback index value and the resource indicator previously sent. Thus, the radio-network node 12 knows which value in the UL control message relates to which data transmission and which subframe.

Action 407. The radio-network node 12 then determines whether to retransmit the data transmissions and/or data of subframes based on the read feedback.

In the examples herein four ACK/NACK-positions are used for feedback information. However, this is only an example and the solution described herein also works for different sizes of the feedback message and the size may have implications on how the value of the offset that is used when using the same xPUCCH-resource for several transmissions is determined.

Figure 5:
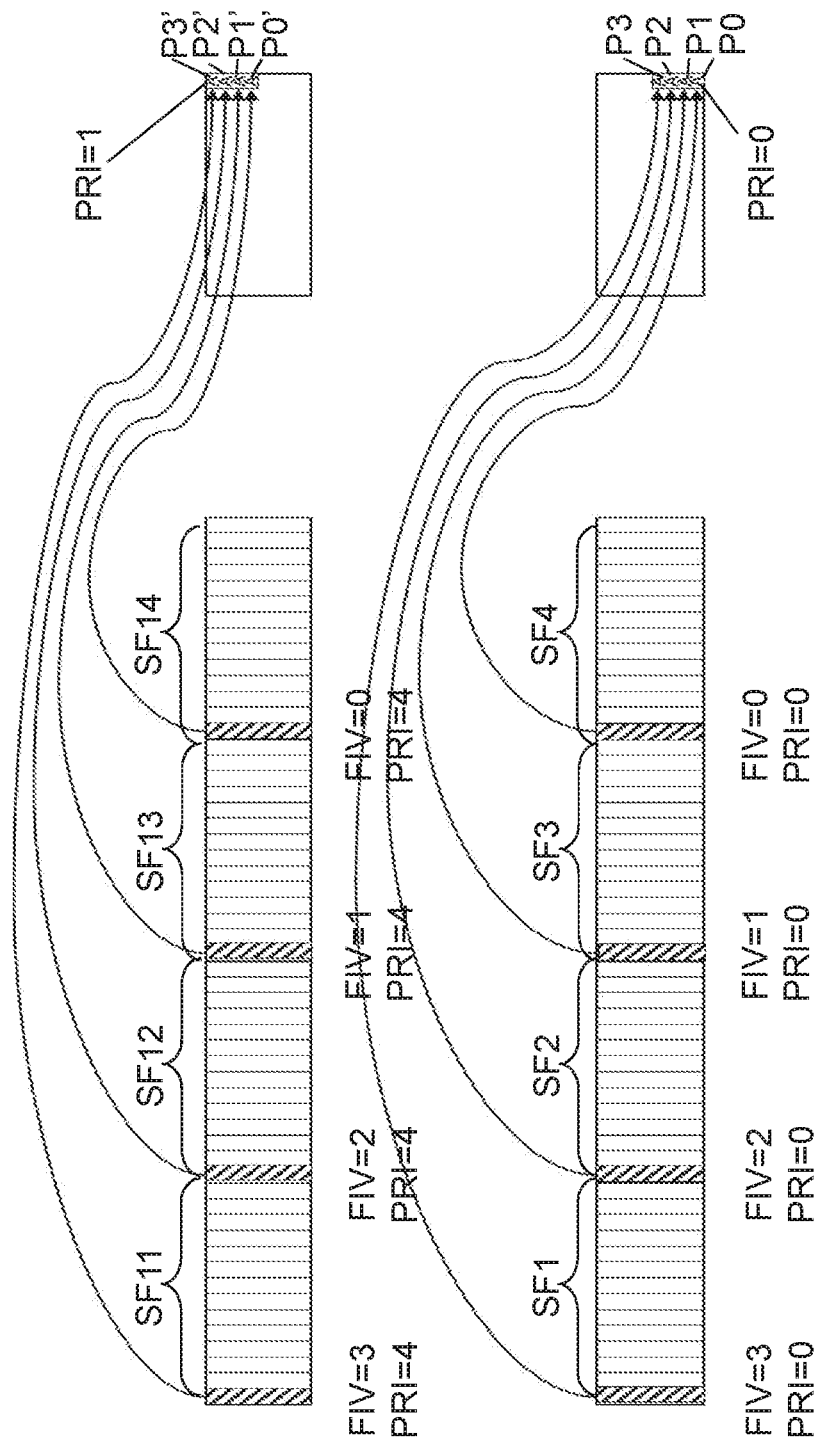
FIG. 5 is a block diagram depicting positioning of feedback indication in a feedback message according to embodiments herein.

FIG. 5 is a block diagram depicting an efficient manner of mapping feedback indications of two simultaneous data transmissions to two feedback messages such as UL control messages, e.g. two separate (x)PUCCHs, based on a respective feedback index value in the DL grant. Feedback for a number of subframes carrying data of one data transmission are aggregated into one feedback occasion.

Each DL grant indicates, with a PUCCH indication, which PUCCH resources should be used for the respective HARQ feedback message. Here, two DL grants will map their respective HARQ feedback to different PUCCH resources.

A fourth SF, SF4, out of the number of subframes of the first transmission for which feedback is aggregated into one feedback occasion, comprises a FIV of zero indicating a time offset or delay of a default/configured value and also indicating at a first position also called position zero, P0.

A third SF, SF3, out of the number of SFs comprises a FIV of one indicating a time offset or delay of a subframe plus the offset of the default/configured value for the feedback indication to be transmitted. The feedback indication is to be indicated at a second position also called position one, P1.

A second SF, SF2, out of the number of subframes comprises a FIV of two indicating a time offset or delay of two subframes plus the offset of the default/configured value for the feedback indication of data of this subframe to be transmitted. The feedback indication is to be indicated at a third position also called position two, P2.

A first SF, SF1, out of the number of SFs comprises a FIV of three indicating a time offset or delay of three subframes plus the offset of the default/configured value for the feedback indication of data of this subframe to be transmitted. The feedback indication is to be indicated at a fourth position also called position three, P3.

Furthermore, each control part may indicate which PUCCH resources to use, i.e. the PUCCH resource indicator is the same for all subframes in the first transmission, e.g. PRI=0.

A fourth SF, SF14, out of the number of subframes of the second transmission for which feedback is aggregated into one feedback occasion, comprises a FIV of zero indicating a time offset or delay of a default/configured value and also indicating at a first position also called position zero prim, P0'.

A third SF, SF13, out of the number of SFs comprises a FIV of one indicating a time offset or delay of one subframe plus the offset of the default/configured value for the feedback indication to be transmitted. The feedback indication is to be indicated at a second position also called position one prim, P1'.

A second SF, SF12, out of the number of SFs comprises a FIV of two indicating a time offset of delay of two subframes plus the offset of the default/configured value for the feedback indication of this SF to be transmitted. The feedback indication is to be indicated at a third position also called position two prim, P2'.

A first SF, SF11, out of the number of SFs comprises a FIV of three indicating a time offset or delay of three SFs plus the offset of the default/configured value for the feedback indication of this SF to be transmitted. The feedback indication is to be indicated at a fourth position also called position three prim, P3'.

Furthermore, each SF or control part of SF indicates which PUCCH resources to use, i.e. the PUCCH resource indicator of all subframes is the same for the second transmission, e.g. PRI=1. It should be noted that PRI may be any value distinguishing the PUCCH resources used, e.g. 1, 2, 3 . . . that enumerates the PUCCH-resources independently of the size of the PUCCH.

Thus, in the control part associated with the data of the SF, Downlink grant DCI fields may comprise Feedback index values of 2 bits and also the PRI, e.g. an xPUCCH resource indicator.

HARQ feedback encoding may be according to LTE PUCCH format 3, which supports up to 22 bits. Six bits may be used for HARQ feedback: $a_0, a_1, a_2, a_3, a_4,$ as, where bits $a_0, a_1, a_2, a_3$: are ACK bits for up to four transmissions or transport blocks. For example, ACK at feedback index $i \Rightarrow a_i=1$ and NACK or no transmission at feedback index $i \Rightarrow a_i=0$.

Figure 6:
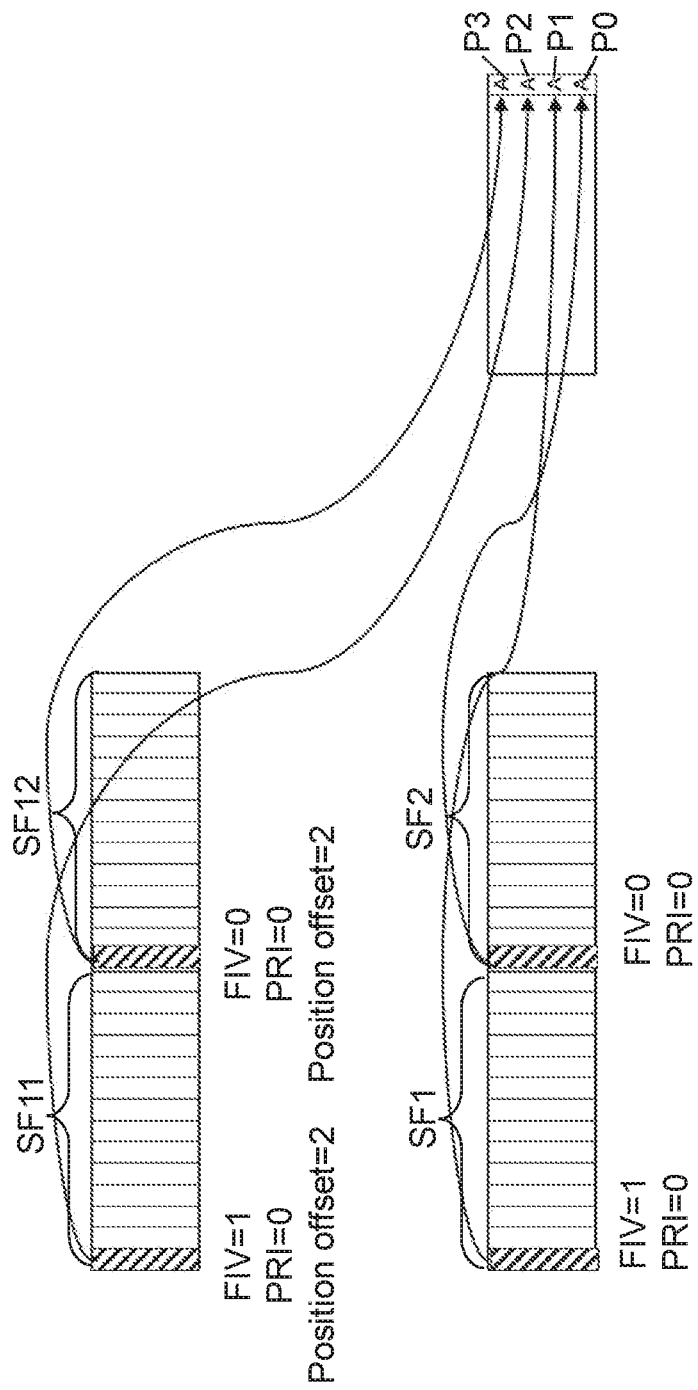
FIG. 6 is a block diagram depicting positioning of feedback indication in a feedback message according to embodiments herein.

FIG. 6 is a block diagram depicting an efficient manner of mapping feedback indications of two simultaneous data transmissions to one feedback message such as an UL control message, e.g. a (x)PUCCH, based on a respective feedback index value in the DL grant. Feedback for a number of subframes with data of two or more data transmissions, a first and second transmission parallel in time, are aggregated into one feedback occasion in one feedback message.

Each DL grant indicates, with the feedback index value, which positions in the PUCCH resource should be used for the respective HARQ feedback message. Here, two DL grants will map their respective HARQ feedback to same PUCCH resources. E.g. the PRI may be '0' for both transmissions.

The feedback index equals the feedback delay and indicates position in the feedback message or PUCCH. The position may be the same value as FIV or a position of FIV plus a position offset value that is different for different simultaneous data transmissions. The position offset value may be indicated in the DL grant. In one embodiment the DL grant indicates a transmission number which is 0 for the first transmission and '1' for the second transmission. And the position offset value indicated in the DL grant is '0' for the first transmission and '2' for the second transmission indicating an additional two on the indicated position, that means initiates a first position for the second transmission for the feedback at position two of the PUCCH.

A second SF, SF2, out of a number of SFs of the first transmission for which feedback is aggregated into one feedback occasion, comprises a FIV of zero indicating a time offset or delay of a default/configured value and also indicating at a first position also called position zero, P0. A first SF, SF1, out of the number of SFs comprises a FIV of one indicating a time offset or delay of one subframe plus the offset of the default/configured value for the feedback indication to be transmitted. The feedback indication is to be indicated at a second position also called position one, P1. Furthermore, each SF or control part of SF indicates which PUCCH resources to use, i.e. the PUCCH resource indicator, PRI, is the same for the SFs of the first transmission, e.g. the PRI=0.

Also the PUCCH resource indicator (PRI) and the position offset value are the same for the second transmission, e.g. the PRI=0 and a position offset value=2. This means an offset of the position in the feedback message by two. Hence, a second SF, SF12, out of the number of SFs of the second transmission for which feedback is aggregated into one feedback occasion, comprises a FIV of zero indicating a time offset or delay of a default/configured value and also indicating at a first position also called position two, P2, defined by the FIV+the position offset, 2. A first SF, SF11, out of the number of SFs comprises a FIV of one indicating a time offset or delay of one SF plus the offset of the default/configured value for the feedback indication to be transmitted. The feedback indication is to be indicated at a third position also called position three, P3, defined by the FIV+the position offset, 2.

The embodiments described herein disclose a FIV that gives the delay/offset and the position of the feedback as a same value, e.g. zero and position zero, and an offset value is added to all position values in case there is a second transmission being mapped to the same xPUCCH-resource. However, the mapping of the feedback indicators to the positions may be in an alternate manner, e.g. SF2-P0; SF12-P1, SF1-P2, and SF11-P3, i.e. when a position offset is added based on SF-value to both transmissions, rather than only to the second transmission. Hence, the delay/offset value and the position may not be the same numerical value but the FIV defines both the time offset and the position in the feedback message.

Figure 7:
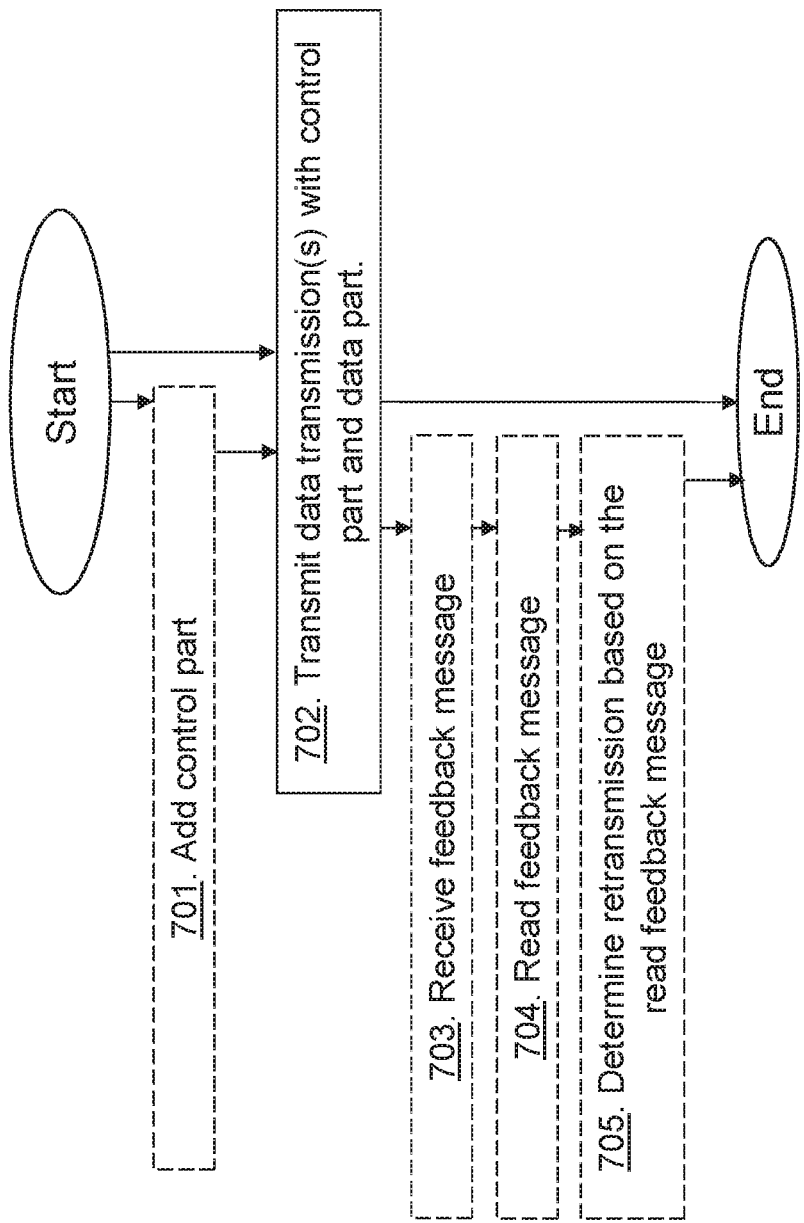
FIG. 7 is a schematic flowchart depicting a method performed by a radio-network node according to embodiments herein.

FIG. 7 is a flowchart depicting a method performed by the radio-network node 12 for handling a data communication of the wireless device 10 such as a data transmission in a number of subframes, from the radio-network node 12 to a wireless device 10 in the wireless communications network 1. Actions may be performed in any suitable order and optional actions are marked as dashed boxes.

Action 701. The radio-network node 12 may add the control information e.g. control part associated to a data transmission over a subframe, to the data transmission or data transmissions.

Action 702. The radio-network node 12 transmits data over one or more subframes to the wireless device 10, and the respective control part, such as a DL grant, associated with the data of the subframe. The control part comprises the feedback index. The feedback index is indicating the time or the time offset for the transmission time of the feedback indication in the feedback message from the wireless device. Thus in some embodiments, the radio-network node 12 transmits data over the number of subframes to the wireless device 10. Each subframe comprises a control part such as a DL grant associated with the data of the subframe. Each respective control part comprises a feedback index indicating a transmission time offset of a feedback message. The feedback message is to comprise a respective feedback indication of the number of subframes, to be transmitted simultaneously from the wireless device 10 to the radio-network node 12 in the feedback message. The feedback index may also indicate the position for the feedback indication in the feedback message.

In some embodiments two or more simultaneous data transmissions are performed towards the wireless device, such as the data transmission and one or more simultaneous data transmissions i.e. the two or more data transmissions, are transmitted to the wireless device 10. In some of these embodiments the control part also comprises the resource indicator indicating the UL control resource to use, e.g. PUCCH resource. Thus the control part of the respective subframe of the two or more simultaneous data transmissions may further comprise a resource indicator indicating an uplink control resource to use for the feedback message. In some of these embodiments the control part may also indicate a position offset value indicating an offset in the position in the feedback message. Thus the control part of the respective subframe of the two or more simultaneous data transmissions may further comprise a position offset value indicating an offset in the position in the feedback message, which offset value is different for different simultaneous data transmissions.

Action 703. The radio-network node 12 may receive feedback from the wireless device in the feedback message transmitted on e.g. PUCCH. Thus the radio-network node 12 may receive, as indicated in the received control parts of the transmission, the respective feedback indication of the number of subframes simultaneously in the feedback message from the wireless device 10.

Action 704. The radio-network node 12 may read feedback indicators in the feedback message as indicated with the feedback index, the resource indicator, and/or the position offset value.

Action 705. The radio-network node 12 may then determine based on the read feedback whether or which data to retransmit. In some embodiments, the radio-network node 12 may determine whether or not to retransmit data of any of the different subframes based on the feedback indications in the feedback message from the wireless device 10.

Figure 8:
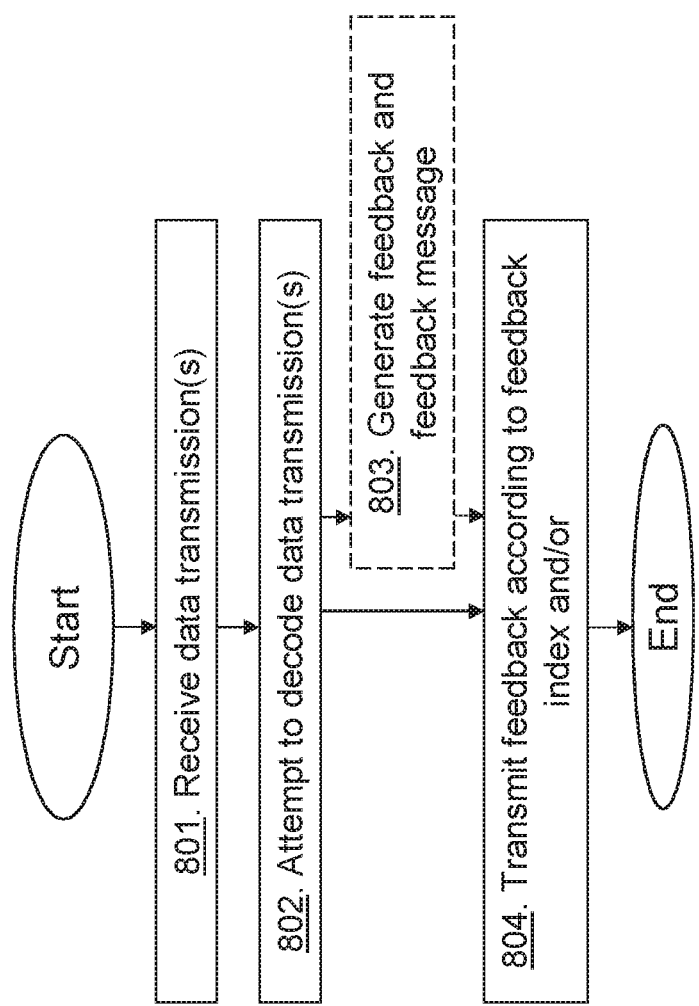
FIG. 8 is a schematic flowchart depicting a method performed by a wireless device according to embodiments herein.

FIG. 8 is a flowchart depicting a method performed by the wireless device 10 for handling data communication from the radio-network node 12 such as a data transmission in a number of subframes from the radio-network node 12 to the wireless device 10, in the wireless communications network 1. Actions may be performed in any suitable order and optional actions are marked as dashed boxes.

Action 801. The wireless device 10 receives data over one or more subframes to from the radio-network node 12, and the respective control part, such as a DL grant, associated with the data of the subframe. The control part comprises the feedback index. The feedback index is indicating the time or the time offset for the transmission time of the feedback indication or indicators in the feedback message from the wireless device 10. The feedback index also indicates the position for the feedback indication or indicator in the feedback message.

In some embodiments, the wireless device 10 receives data over the number of subframes from the radio-network node 12. Each subframe comprising a control part such as a DL grant associated with the data of the subframe, each respective control part comprising a feedback index indicating a transmission time offset of a feedback message. The feedback message is to comprise a respective feedback indication of the number of subframes to be transmitted simultaneously from the wireless device 10 to the radio-network node 12 in the feedback message. The respective feedback index may further indicate a position for the feedback indication in the feedback message.

In some embodiments where two or more simultaneous data transmissions are performed towards the wireless device, the control part also comprises the resource indicator indicating the UL control resource to use, e.g. PUCCH resource. The control part may also indicate a position offset value indicating an offset in the position in the feedback message. Thus the data transmission and one or more simultaneous data transmissions, i.e. the two or more data transmissions, from the radio-network node 12 are received by the wireless device 10. In some of these embodiments, the control part of the respective subframe of the two or more simultaneous data transmissions further comprises a resource indicator indicating an uplink control resource to use for the feedback message. In some of these embodiments, the control part of the respective subframe of the two or more simultaneous data transmissions further comprises a position offset value indicating an offset in the position in the feedback message, which offset value is different for different simultaneous data transmissions.

Action 802. The wireless device 10 then attempts to decode the control part and the data of each subframe. The wireless device 10 attempts to decode the transmission or transmissions, e.g. the control parts and the data of each subframe.

Action 803. The wireless device 10 may generate feedback indicator of respective subframe and add feedback indicators into the feedback message as indicated by the respective control part.

Action 804. The wireless device 10 then transmits feedback indicators in the feedback message as indicated in the received control parts of the transmission or transmissions. In some embodiments, the wireless device 10 transmits the respective feedback indication of the number of subframes simultaneously in the feedback message as indicated in the received control parts of the transmission, to the radio-network node 12.

Figure 9:
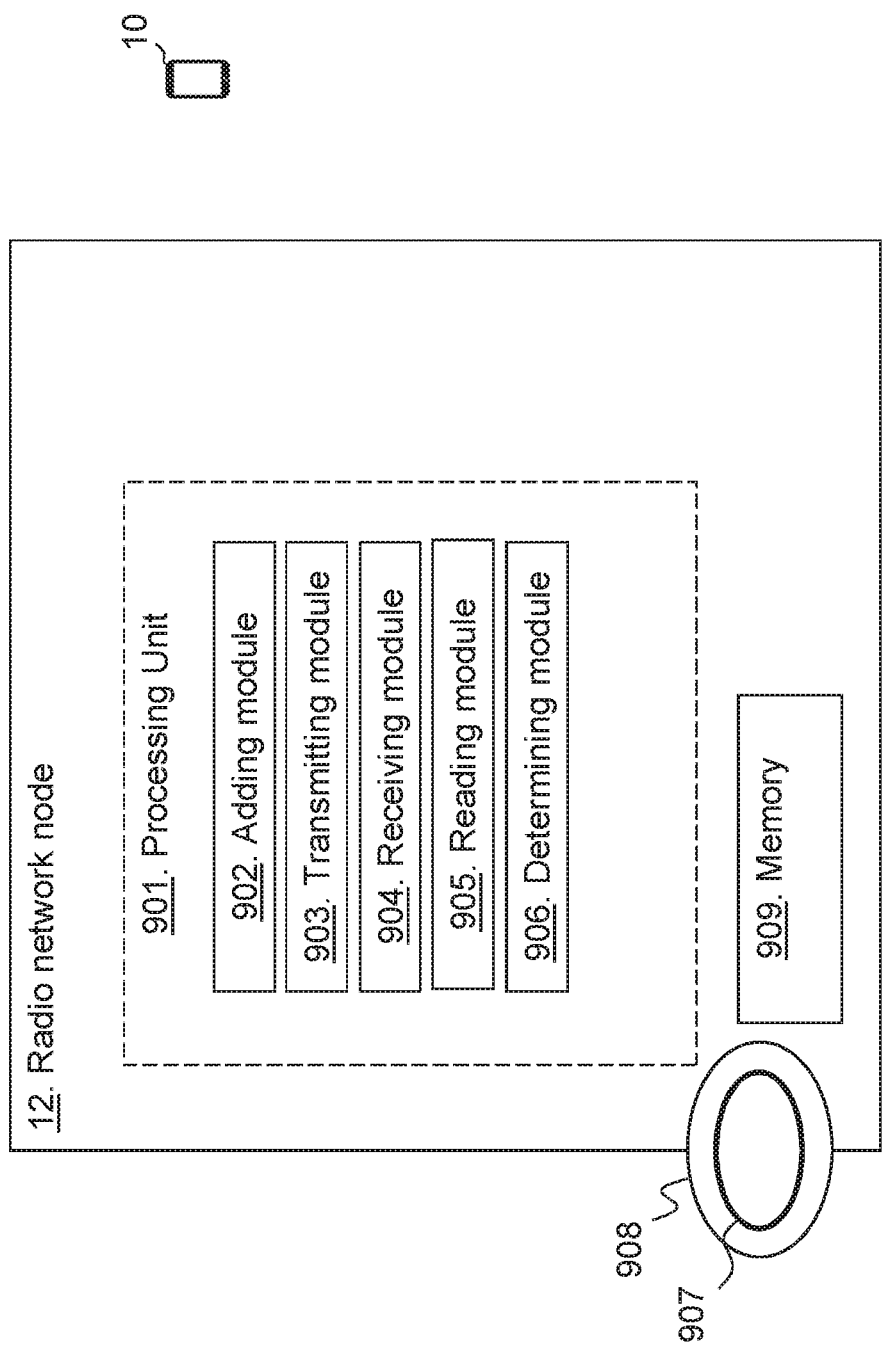
FIG. 9 is a block diagram depicting a radio-network node according to embodiments herein.

FIG. 9 is a block diagram depicting the radio-network node 12 for handling data communication of the wireless device 10 in the wireless communications network 1 such as for handling a data transmission in a number of subframes, from the radio-network node 12 to a wireless device 10 in a wireless communication network 1.

The radio-network node 12 may comprise a processing unit 901, such as one or more processors, configured to perform the methods herein.

The radio-network node 12 may comprise an adding module 902. The radio-network node 12, the processing unit 901, and/or the adding module 902 may be configured to add the control information e.g. control part associated to a data transmission over a subframe, to the data transmission or data transmissions.

The radio-network node 12 may comprise a transmitting module 903. The radio-network node 12, the processing unit 901, and/or the transmitting module 903 may be configured to transmit data over one or more subframes to the wireless device 10, and the respective control part, such as a DL grant, associated with the data of the subframe. The control part comprises the feedback index. The feedback index is indicating the time or the time offset for the transmission time offset of the feedback indication in the feedback message from the wireless device. The feedback index also indicates the position for the feedback indication in the feedback message. In some embodiments where two or more simultaneous data transmissions are performed towards the wireless device, the control part also comprises the resource indicator indicating the UL control resource to use, e.g. PUCCH resource. The control part may also indicate a position offset value indicating an offset in the position in the feedback message.

The radio-network node 12, the processing unit 901, and/or the transmitting module 903 may be configured to transmit data over the number of subframes to the wireless device 10, each subframe comprising a control part such as a DL grant associated with the data of the subframe, each respective control part comprising a feedback index indicating a transmission time offset of a feedback message, which feedback message is to comprise a respective feedback indication of the number of subframes, to be transmitted simultaneously from the wireless device 10 to the radio-network node 12 in the feedback message.

The respective feedback index may further be adapted to indicate a position for the feedback indication in the feedback message.

In some embodiments, the data transmission and one or more simultaneous data transmissions are to be transmitted to the wireless device 10. In some of these embodiments, the control part of the respective subframe of the two or more simultaneous data transmissions further is adapted to comprise a resource indicator indicating an uplink control resource to use for the feedback message. In some of these embodiments, the control part of the respective subframe of the two or more simultaneous data transmissions further is adapted to comprise a position offset value indicating an offset in the position in the feedback message, which offset value is different for different simultaneous data transmissions.

The radio-network node 12 may comprise a receiving module 904. The radio-network node 12, the processing unit 901, and/or the receiving module 904 may be configured to receive feedback from the wireless device 10 in the feedback message e.g. PUCCH. The radio-network node 12, the processing unit 901, and/or the receiving module 904 may receive as indicated in the received control parts of the transmission, the respective feedback indication of the number of subframes simultaneously in the feedback message from the wireless device 10.

The radio-network node 12 may comprise a reading module 905. The radio-network node 12, the processing unit 901, and/or the reading module 905 may be configured to read feedback indicators in the feedback message as indicated with the feedback index, the resource indicator, and/or the position offset value.

The radio-network node 12 may comprise a determining module 906. The radio-network node 12, the processing unit 901, and/or the determining module 906 may be configured to determine based on the read feedback whether or which data to retransmit. The radio-network node 12, the processing unit 901, and/or the determining module 906 may determine whether or not to retransmit data of any of the different subframes based on the feedback indications in the feedback message from the wireless device 10.

The methods according to the embodiments described herein for the radio-network node 12 are respectively implemented by means of e.g. a computer program 907 or a computer program product, comprising instructions, i.e., software code portions, which, when executed on at least one processor, cause the at least one processor to carry out the actions described herein, as performed by the radio-network node 12. The computer program 907 may be stored on a computer-readable storage medium 908, e.g. a disc or similar. The computer-readable storage medium 908, having stored there on the computer program, may comprise the instructions which, when executed on at least one processor, cause the at least one processor to carry out the actions described herein, as performed by the radio-network node 12. In some embodiments, the computer-readable storage medium may be a non-transitory computer-readable storage medium.

The radio-network node 12 further comprises a memory 909. The memory comprises one or more units to be used to store data on, such as feedback indicators, resources, FIVs, PRIs, positions offsets, transmission numbers, applications to perform the methods disclosed herein when being executed, and similar.

Figure 10:
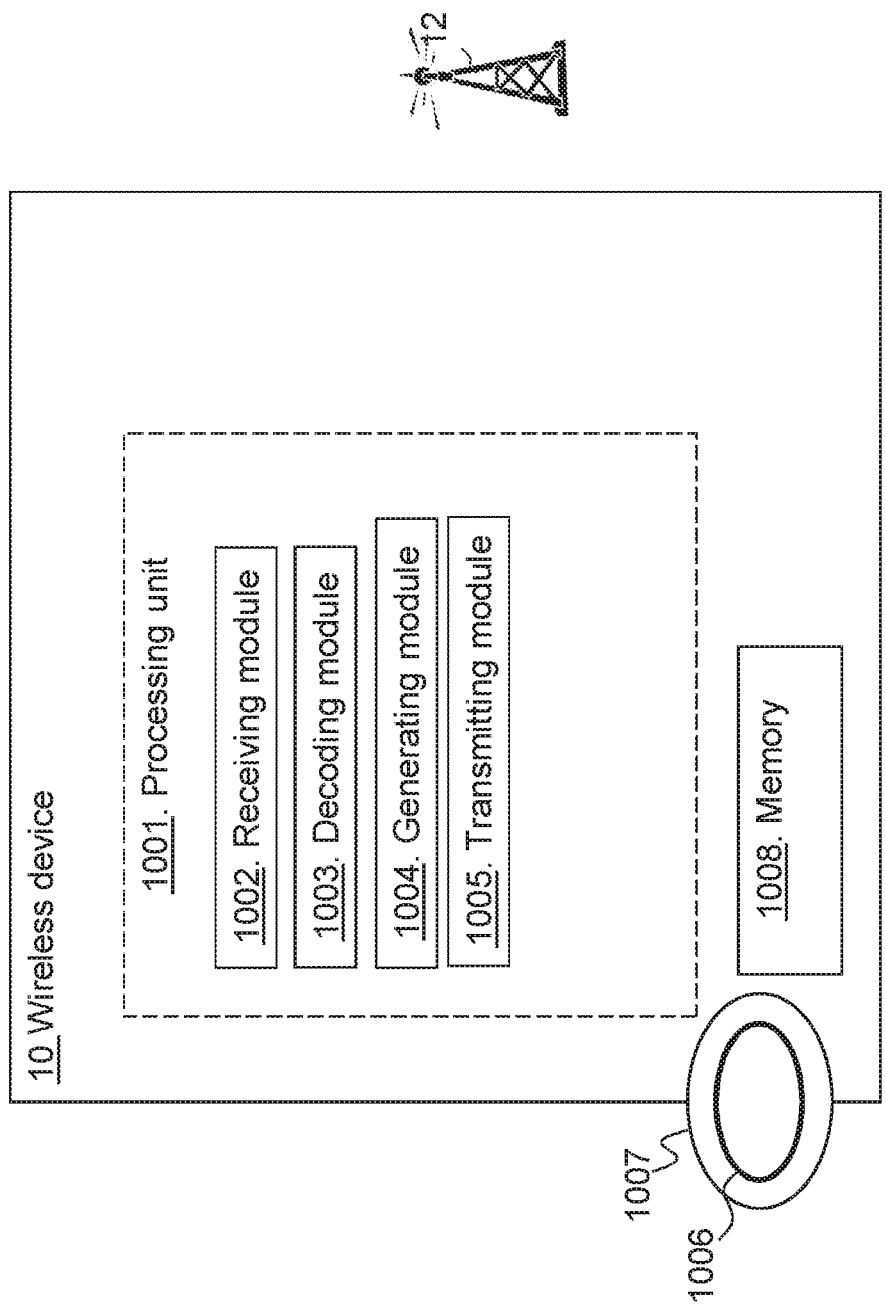
FIG. 10 is a block diagram depicting a wireless device according to embodiments herein.

FIG. 10 is a block diagram depicting the wireless device 10 for handling data communication from the radio-network node 12 such as handling a data transmission in a number of subframes, from a radio-network node 12 to the wireless device 10 in a wireless communication network 1.

The wireless device 10 may comprise a processing unit 1001, such as one or more processors, configured to perform the methods herein.

The wireless device 10 may comprise a receiving module 1002. The wireless device 10, the processing unit 1001, and/or the receiving module 1002 may be configured to receive data over one or more subframes to from the radio-network node 12, and the respective control part, such as a DL grant, associated with the data of the subframe. The control part comprises the feedback index. The feedback index is indicating the time or the time offset for the transmission time offset of the feedback indication or indicators in the feedback message from the wireless device 10. The feedback index also indicates the position for the feedback indication or indicator in the feedback message. In some embodiments where two or more simultaneous data transmissions are performed towards the wireless device, the control part also comprises the resource indicator indicating the UL control resource to use, e.g. PUCCH resource. The control part may also indicate a position offset value indicating an offset in the position in the feedback message.

The wireless device 10, the processing unit 1001, and/or the receiving module 1002 may be configured to receive data over the number of subframes from a radio-network node 12. Each subframe comprising a control part such as a DL grant associated with the data of the subframe, each respective control part comprising a feedback index indicating a transmission time offset of a feedback message. The feedback message is to comprise a respective feedback indication of the number of subframes to be transmitted simultaneously from the wireless device 10 to the radio-network node 12 in the feedback message.

The respective feedback index may further be adapted to indicate a position for the feedback indication in the feedback message. 28.

In some embodiments, the data transmission and one or more simultaneous data transmissions from the radio-network node 12 are to be received by the wireless device 10. In some of these embodiments, the control part of the respective subframe of the two or more simultaneous data transmissions further is adapted to comprise a resource indicator indicating an uplink control resource to use for the feedback message. Further, in some of these embodiments, the control part of the respective subframe of the two or more simultaneous data transmissions may further be adapted to comprise a position offset value indicating an offset in the position in the feedback message, which offset value is different for different simultaneous data transmissions.

The wireless device 10 may comprise a decoding module 1003. The wireless device 10, the processing unit 1001, and/or the decoding module 1003 may be configured to attempt to decode the control parts and the data of each subframe. The wireless device 10, the processing unit 1001, and/or the decoding module 1003 may be configured to attempt the transmission or transmissions, e.g. the control parts and the data of each subframe.

The wireless device 10 may comprise a generating module 1004. The wireless device 10, the processing unit 1001, and/or the generating module 1004 may be configured to generate feedback indicator of respective subframe and add feedback indicators into the feedback message as indicated by the respective control part.

The wireless device 10 may comprise a transmitting 1005. The wireless device 10, the processing unit 1001, and/or the transmitting module 1005 may be configured to transmit feedback indicators in the feedback message as indicated in the received control parts of the transmission or transmissions. The wireless device 10, the processing unit 1001, and/or the transmitting module 1005 may be configured to transmit the respective feedback indication of the number of subframes simultaneously in the feedback message as indicated in the received control parts of the transmission, to the radio-network node 12.

The methods according to the embodiments described herein for the wireless device 10 are respectively implemented by means of e.g. a computer program 1006 or a computer program product, comprising instructions, i.e., software code portions, which, when executed on at least one processor, cause the at least one processor to carry out the actions described herein, as performed by the wireless device 10. The computer program 1006 may be stored on a computer-readable storage medium 1007, e.g. a disc or similar. The computer-readable storage medium 1007, having stored there on the computer program, may comprise the instructions which, when executed on at least one processor, cause the at least one processor to carry out the actions described herein, as performed by the wireless device 10. In some embodiments, the computer-readable storage medium may be a non-transitory computer-readable storage medium.

The the wireless device 10 further comprises a memory 1008. The memory comprises one or more units to be used to store data on, such as feedback indicators, resources, FIVs, PRIs, positions offsets, transmission numbers, applications to perform the methods disclosed herein when being executed, and similar.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a radio-network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory.

Other hardware, conventional and/or custom, may also be included. Designers of radio-network nodes will appreciate the cost, performance, and maintenance trade-offs inherent in these design choices.

Modifications and other embodiments of the disclosed embodiments will come to mind to one skilled in the art having the benefit of the teachings presented in the foregoing descriptions and the associated drawings. Therefore, it is to be understood that the embodiment(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

Some embodiments are described as follows below.

According to embodiments herein the object is achieved by providing a method performed by a radio-network node for handling a data transmission, such as transmission of data in a number of subframes, from the radio-network node to a wireless device in a wireless communication network. The radio-network node transmits data over a subframe to the wireless device, and a control part, such as a DL grant, associated with the data of the subframe. The control part comprises a feedback index or a feedback index value. The feedback index is indicating a time or a time offset for a transmission time offset of a feedback indication in a feedback message from the wireless device. The feedback index also indicates a position for the feedback indication in the feedback message. In some embodiments where two or more simultaneous data transmissions are performed towards the wireless device, the control part also comprises a resource indicator indicating a UL control resource to use.

According to embodiments herein the object is achieved by providing a method performed by a wireless device for handling a data transmission from the radio-network node to the wireless device in a wireless communication network. The wireless device receives the data transmission such as data in a number of subframes, from the radio-network node, and a control part, such as a DL grant, associated with a data of a subframe. The control part comprises a feedback index or a feedback index value. The feedback index is indicating a time or a time offset for a transmission time offset of a feedback indication in a feedback message from the wireless device. The feedback index also indicates a position for the feedback indication in the feedback message. In some embodiments where the wireless device receives two or more simultaneous data transmissions, the control part also comprises a resource indicator indicating an UL control resource to use. The wireless device attempts to decode the transmission or transmissions and transmits feedback indicators in the feedback message as indicated in the received control parts of the transmission or transmissions.

Further, a radio-network node and a wireless device configured to perform the methods herein are also provided herein.

It is furthermore provided herein a computer program comprising instructions, which, when executed on at least one processor, cause the at least one processor to carry out any of the methods above, as performed by the radio-network node or the wireless device. It is additionally provided herein a computer-readable storage medium, having stored there on a computer program comprising instructions which, when executed on at least one processor, cause the at least one processor to carry out the method according to any of the methods above, as performed by the radio-network node or the wireless device.

Embodiments herein provide a manner of enabling feedback of a data transmission to a radio-network node in an efficient manner. By letting the feedback index be associated with the time offset of the transmission of the feedback indication and the position in the feedback message, the feedback indication is provided back to the radio-network node in an efficient manner leading to an improved performance of the wireless communication network.

The invention claimed is:

1. A method performed by a radio-network node for handling a data transmission in a number of different subframes from the radio-network node to a wireless device in a wireless communication network, the method comprising:
transmitting data over the number of different subframes to the wireless device, each subframe comprising a control part associated with the data of the subframe, each respective control part comprising a feedback index indicating a transmission time offset of a feedback message,
wherein the feedback message comprises a respective feedback indication for each of the number of different subframes, and wherein the respective feedback indications for each of the number of different subframes are transmitted simultaneously with each other from the wireless device to the radio-network node in the same feedback message.

2. The method according to claim 1, wherein the respective feedback index further indicates a position for the feedback indication in the feedback message.

3. The method according to claim 1, where the data transmission and one or more simultaneous data transmissions are transmitted to the wireless device, and wherein the control part of the respective subframe of the two or more simultaneous data transmissions further comprises a resource indicator indicating an uplink control resource to use for the feedback message.

4. The method according to claim 1, where the data transmission and one or more simultaneous data transmissions are transmitted to the wireless device, and wherein the control part of the respective subframe of the two or more simultaneous data transmissions further comprises a position offset value indicating an offset in the position in the feedback message, wherein the position offset value is different for different simultaneous data transmissions.

5. The method according to claim 1, further comprising receiving as indicated in the received control parts of the transmission, the respective feedback indication for each of the number of different subframes simultaneously in the feedback message from the wireless device.

6. The method according to claim 1, further comprising determining whether or not to retransmit data of any of the different subframes based on the feedback indications in the feedback message from the wireless device.

7. A method performed by a wireless device for handling a data transmission in a number of different subframes from a radio-network node to the wireless device in a wireless communication network, the method comprising:
receiving data over the number of different subframes from the radio-network node, each subframe comprising a control part associated with the data of the subframe, each respective control part comprising a feedback index indicating a transmission time offset of a feedback message, wherein the feedback message comprises a respective feedback indication for each of the number of different subframes, and wherein the respective feedback indications for each of the number of different subframes are transmitted simultaneously with each other from the wireless device to the radio-network node in the same feedback message, and transmitting the respective feedback indication for each of the number of different subframes simultaneously in the feedback message as indicated in the received control parts of the transmission, to the radio-network node.

8. The method according to claim 7, wherein the respective feedback index further indicates a position for the feedback indication in the feedback message.

9. The method according to claim 7, where the data transmission and one or more simultaneous data transmissions from the radio-network node are received by the wireless device, and wherein the control part of the respective subframe of two or more simultaneous data transmissions further comprises a resource indicator indicating an uplink control resource to use for the feedback message.

10. The method according to claim 7, where the data transmission and one or more simultaneous data transmissions from the radio-network node are received by the wireless device, and wherein the control part of the respective subframe of two or more simultaneous data transmissions further comprises a position offset value indicating an offset in the position in the feedback message, wherein the position offset value is different for different simultaneous data transmissions.

11. A radio-network node for handling a data transmission in a number of different subframes from the radio-network node to a wireless device in a wireless communication network, the radio-network node being configured to:

transmit data over the number of different subframes to the wireless device, each subframe comprising a control part associated with the data of the subframe, each respective control part comprising a feedback index indicating a transmission time offset of a feedback message, wherein the feedback message comprises a respective feedback indication for each of the number of different subframes, and wherein the respective feedback indications for each of the number of different subframes are transmitted simultaneously with each other from the wireless device to the radio-network node in the same feedback message.

12. The radio-network node according to claim 11, wherein the respective feedback index is further configured to indicate a position for the feedback indication in the feedback message.

13. The radio-network node according to claim 11, wherein the data transmission and one or more simultaneous data transmissions are to be transmitted to the wireless device, and wherein the control part of the respective subframe of two or more simultaneous data transmissions is further configured to comprise a resource indicator indicating an uplink control resource to use for the feedback message.

14. The radio-network node according to claim 11, wherein the data transmission and one or more simultaneous data transmissions are to be transmitted to the wireless device, and wherein the control part of the respective subframe of two or more simultaneous data transmissions is further configured to comprise a position offset value indicating an offset in the position in the feedback message, wherein the position offset value is different for different simultaneous data transmissions.

15. The radio-network node according to claim 11, further being configured to:

receive as indicated in the received control parts of the transmission, the respective feedback indication for each of the number of different subframes simultaneously in the feedback message from the wireless device.

16. The radio-network node according to claim 11, further being configured to:

determine whether or not to retransmit data of any of the different subframes based on the feedback indications in the feedback message from the wireless device.

17. A wireless device for handling a data transmission in a number of different subframes from a radio-network node to the wireless device in a wireless communication network, the wireless device being configured to:

receive data over the number of different subframes from a radio-network node, each subframe comprising a control part associated with the data of the subframe, each respective control part comprising a feedback index indicating a transmission time of a feedback message, wherein the feedback message comprises a respective feedback indication for each of the number of different subframes, and wherein the respective feedback indications for each of the number of different subframes are transmitted simultaneously with each other from the wireless device to the radio-network node in the same feedback message, and transmit the respective feedback indication for each of the number of different subframes simultaneously in the feedback message, as indicated in the received control parts of the transmission, to the radio-network node.

18. The wireless device according to claim 17, wherein the respective feedback index is further configured to indicate a position for the feedback indication in the feedback message.

19. The wireless device according to claim 17, where the data transmission and one or more simultaneous data transmissions from the radio-network node are to be received by the wireless device, and wherein the control part of the respective subframe of two or more simultaneous data transmissions is further configured to comprise a resource indicator indicating an uplink control resource to use for the feedback message.

20. The wireless device according to claim 17, where the data transmission and one or more simultaneous data transmissions from the radio-network node are to be received by the wireless device, and wherein the control part of the respective subframe of two or more simultaneous data transmissions is further configured to comprise a position offset value indicating an offset in the position in the feedback message, wherein the position offset value is different for different simultaneous data transmissions.

* * * * *